May 20, 1941. H. J. HANZLIK 2,242,673
TURBINE GLAND
Filed Oct. 1, 1938

INVENTOR
HENRY J. HANZLIK.
BY
ATTORNEY

Patented May 20, 1941

2,242,673

UNITED STATES PATENT OFFICE 2,242,673

TURBINE GLAND

Henry J. Hanzlik, Swarthmore, Pa., assignor to Westinghouse Electric & Manufacturing Company, East Pittsburgh, Pa., a corporation of Pennsylvania Application October 1, 1938, Serial No. 232,747

2 Claims. (Cl. 286—10)

This invention relates to turbine glands of the radial labyrinth type and it has for an object to provide apparatus of this character having packing connected by a large number of throttlings in a given space.

Another object of the invention is the provision of labyrinth packing comprised by overlapping collar elements provided with axially-extending sealing and wearing strips carried by stationary collar elements and which define sealing clearances with respect to rotatable collar elements.

A further object of the invention is the provision of labyrinth packing comprised by radially-extending sealing and wearing strips carried by a spindle and its housing, those carried by the spindle defining sealing clearances with respect to fixed collars on the housing and those carried by the housing defining clearances with respect to rotating collars on the spindle.

Yet another object of the invention is the provision of labyrinth packing comprised by radially-extending and axially-extending sealing and wearing strips which are carried by immovable parts.

Figure 1:
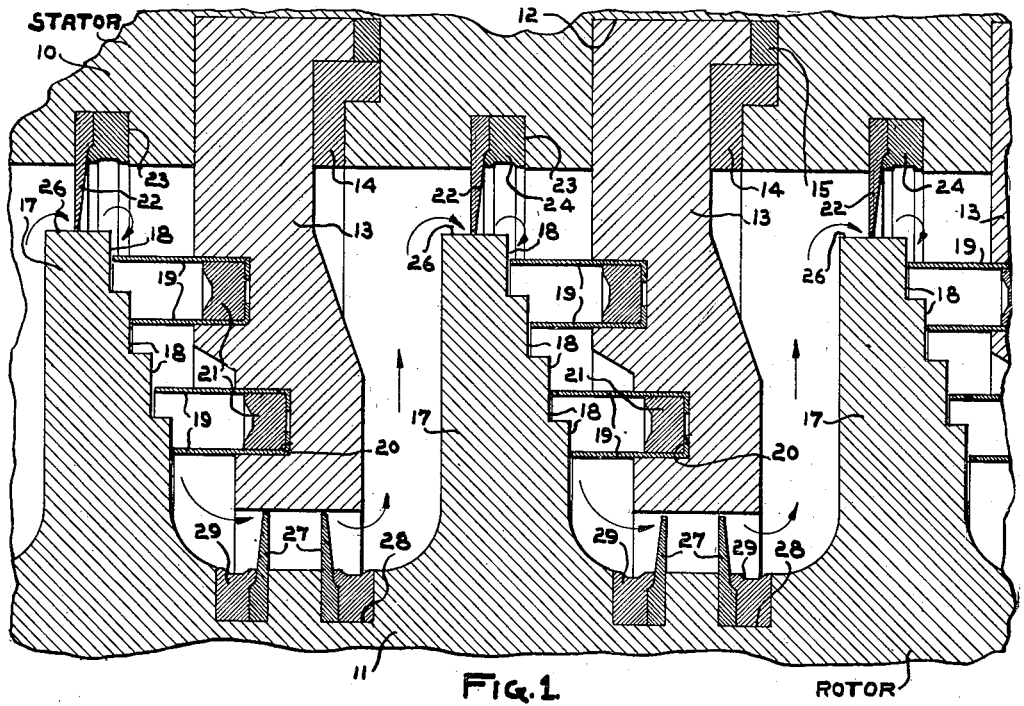
Figure 2:
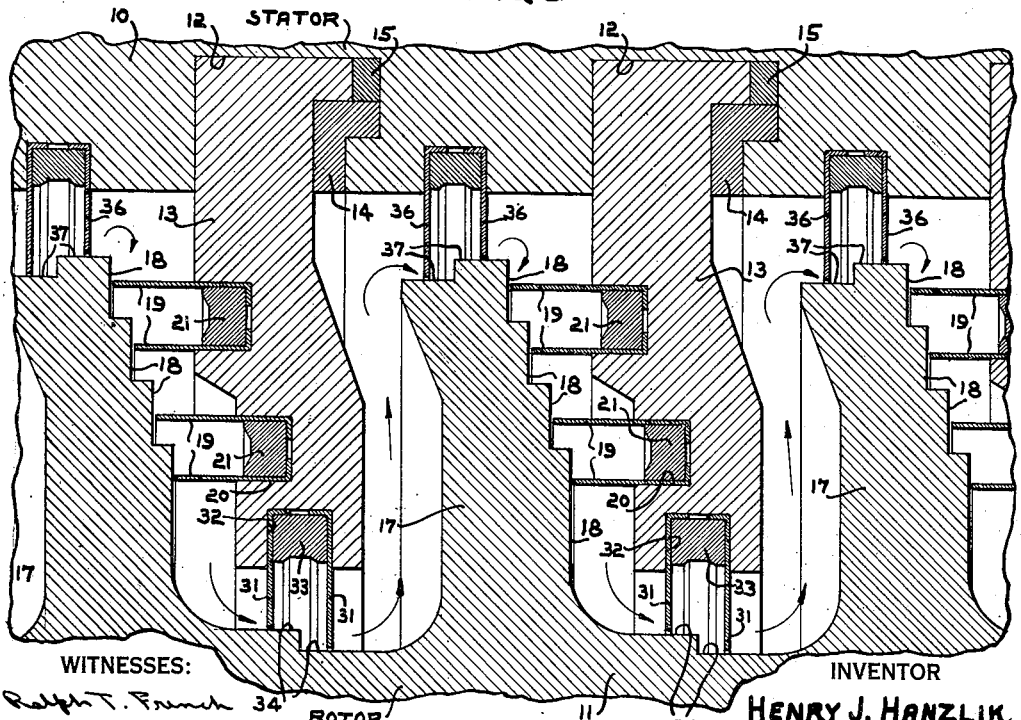

These and other objects are effected by my invention as will be apparent from the following description and claims taken in connection with the accompanying drawing, forming a part of this application, in which:

Fig. 1 is an enlarged fragmentary sectional view illustrating one embodiment of the invention; and, Fig. 2 is a similar view showing a slightly modified construction.

In the drawing, there is shown, in Fig. 1, a turbine housing 10 and spindle 11, the housing being provided with inwardly-opening circumferential grooves 12, spaced axially, and having therein fixed collars 13 secured by key members 14 and caulking members 15.

The spindle 11 likewise is provided with spaced radially-extending collars 17 disposed in radially overlapping relation with respect to the fixed collars 13, and provided with stepped radial surfaces 18.

Each of the fixed collars 13 is provided with a plurality of coaxial circular metallic sealing strips 19 extending laterally from one face thereof and cooperating with the opposed stepped surfaces 18 on the rotatable collars.

The sealing strips 19 are secured in recesses 20 by caulking strips 21, in a well-known manner. Preferably these sealing strips are formed of relatively thin and flexible metal and are positioned to provide relatively close clearances with respect to the surfaces 18 on the rotatable collars, the thinness of the strips permitting them to wear in case of rubbing.

Single sealing strips 22 extend radially from the housing 10, being secured in recesses 23 by caulking strips 24, and cooperate with axial surfaces 26 at the circumference of the rotatable collars. Additional radially-extending sealing strips 27 are secured in recesses 28 in the spindle body 11 by caulking strips 29, these sealing strips providing relatively close clearances with respect to the axially-extending circumferential surfaces of the fixed collar 13.

It will be noted that in Fig. 1 the radially-extending sealing strips, 22 and 27, are of relatively heavy section as compared with the axially-extending strips 19. This novel combination and arrangement possesses several advantages over prior practice.

When the turbine is being "run in" after manufacture or replacement of the seal strips, the latter are usually worn or ground down to correct fit by contact of the rotating collars 17 with the ends of the strips 19. This involves an operation requiring extreme care, as excessive friction and resulting heat will destroy the physical characteristics of the strips. By providing relatively thin axial strips the amount of heat developed by the friction of wearing or grinding the strips is held to a minimum.

Upon starting the turbine during normal use of the same, it is necessary to adjust the spindle for relatively large clearances at the axial strips to allow for expansion as the parts become heated. Such clearances would permit an excessive flow of steam therethrough which would bend and permanently deform the thin strips if it were not for the presence of the relatively heavy radial strips which prevent the flow of steam becoming excessive.

Furthermore, in the event of warping of the dummy, which will result in destruction of the adjustment of the clearances at the axial strips, the clearances of the radial strips will remain substantially unchanged, thereby maintaining suitable sealing.

The construction shown in Fig. 2 differs from that of Fig. 1 in that the seals between the inner circumferential edges of the fixed collars and the body of the spindle are provided by a plurality of sealing strips 31 secured in the recesses 32 in the circumferential surfaces of the fixed collars by caulking strips 33, these sealing strips 31 cooperating with stepped surfaces 34 on the body of the spindle 11. In this construction, two sealing strips 36 cooperate with the stepped axial surfaces 37, to provide for sealing between the housing body 10 and the outer circumferential surfaces of the rotatable collars 17.

It will be seen that, by these arrangements, there is provided, in a limited space, a relatively tortuous path for steam flow, rendering it possible to materially shorten the length of the spindle and hence the overall length of the turbine.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a gland for sealing a turbine spindle with respect to its housing wherein the spindle is subject to axial movement upon heating; a fixed collar carried by the housing; a rotatable collar carried by the spindle and disposed in radial overlapping relation with respect to the fixed collar; said rotatable collar having radially-extending and stepped sealing faces at one side thereof; a plurality of coaxial metallic strips extending laterally from one side of the fixed collar and defining axial sealing clearances with respect to said stepped sealing faces; means sealing the outer peripheral surface of the rotatable collar with respect to the inner surface of the housing, said means comprising seal strip packing carried by and extending from one of said surfaces and defining radial sealing clearance with respect to the other of said surfaces; and means sealing the inner peripheral surface of the fixed collar with respect to the peripheral surface of the rotor, said last-mentioned means comprising seal strip packing carried by and extending from one of said last-mentioned surfaces and defining radial sealing clearance with respect to the other of said last-mentioned surfaces.

2. In a gland for sealing a turbine spindle with respect to its housing including cooperating and axially-spaced pairs of radially overlapping rotatable and fixed collars, the fixed collars being carried by the housing, the rotatable collars being carried by the spindle and having radially-extending sealing faces and axially-extending sealing faces and said spindle being subject to axial movement upon heating; a plurality of coaxial metallic strips extending laterally from one side of each fixed collar and defining axial sealing clearances with respect to the radially-extending sealing faces of the adjacent rotatable collars, and a plurality of metallic strips extending radially inward from the housing between the fixed collars and defining radial sealing clearances with respect to the axially-extending sealing faces of the opposed rotatable collars.

HENRY J. HANZLIK.